(12) United States Patent
Markow et al.

(10) Patent No.: US 6,314,010 B1
(45) Date of Patent: Nov. 6, 2001

(54) SLOPE-BASED PRIMARY FEEDBACK TO CONTROL THE OFF-TIME OF A POWER SUPPLY

(75) Inventors: Mitchell A. Markow, Spring; Stephen K. Gustafson, Cypress, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/513,678

(22) Filed: Feb. 25, 2000

(51) Int. Cl.[7] ................................................ H02M 3/335
(52) U.S. Cl. ................................. 363/97; 363/21.18
(58) Field of Search ................... 363/20, 21, 97, 363/131

(56) References Cited

U.S. PATENT DOCUMENTS

| | | | |
|---|---|---|---|
| 4,814,965 | 3/1989 | Petersen | 363/65 |
| 4,821,165 | 4/1989 | Gunn | 363/60 |
| 4,885,674 | * 12/1989 | Varga et al. | 363/21 |
| 4,888,821 | * 12/1989 | Hamp et al. | 363/21 |
| 4,994,719 | 2/1991 | Lendaro | 315/411 |
| 5,068,775 | * 11/1991 | Borgatti et al. | 363/97 |
| 5,173,846 | * 12/1992 | Smith | 363/131 |
| 5,644,198 | 7/1997 | Park | 315/411 |
| 5,671,129 | 9/1997 | Lang | 363/19 |
| 5,703,765 | 12/1997 | Preis | 363/21 |

(List continued on next page.)

OTHER PUBLICATIONS

Taub et al., *Digital Integrated Electronics*, 1977, pp. 545–552.*
*TinySwitch™ Flyback Design Methodology*, Power Integrations, Inc., Application Note AN–23, Nov. 1998.
*Flyback Transformer Design for TOPSwitch® Power Supplies*, Power Integrations, Inc., Application Note AN–17, Jun. 1996.
*TOPSwitch® Flyback Design Methodology*, Power Integrations, Inc., Application Note AN–16, Jun. 1996.
*Switch Mode Power Supplies*, C.J. Hill, May 12, 1999, http:\\www.hills2.u–net.com/electron/smps.htm.
*Linear & Switching Voltage Regulator Applications Information*, Motorola Analog IC Device Data, pp.3–817–3–916 Jan. 2000.
*Power Supply Circuits*, Motorola Master Selection Guide, Analog and Interface Integrated Circuits pp. 4.2–1–4.2–33 Jan. 2000.
*High Side PWM FET Controller*, Cherry Semiconductor Corporation, Jul. 22, 1999, pp.1–7.
*Low Side PWM FET Controller*, Cherry Semiconductor Corporation, Jul. 22, 1999, pp. 1–4.
*Enhanced Current Mode PWM Controller*, Cherry Semiconductor Corporation, Jun. 24, 1999, pp. 1–9.

*Primary Examiner*—Jeffrey Sterrett
(74) *Attorney, Agent, or Firm*—Akin, Gump, Strauss, Hauer & Feld, LLP

(57) ABSTRACT

A high voltage flyback power supply provides slope-based primary feedback to control the off-time of the power supply. When a negative slope is detected at a low side of a primary winding of the power supply, an off-time cycle is terminated and a next on-time cycle is initiated. The slope-based off-time primary feedback helps to keep the off-time of the power supply in sync with ringing of the primary leakage inductance and the primary-side capacitance of the power supply. Such a power supply is particularly useful for battery-powered systems with low voltage rails. The power supply can also include on-time feedback to shorten the on-time of the power supply after the secondary-side voltage rises beyond a certain relatively high voltage level. In this way, the transformer of the power supply is charged less when the power supply is driving relatively light loads.

23 Claims, 4 Drawing Sheets

U.S. PATENT DOCUMENTS

| | | | |
|---|---|---|---|
| 5,708,572 | 1/1998 | Bergk | 363/21 |
| 5,717,578 * | 2/1998 | Afzal | 363/97 |
| 5,754,415 | 5/1998 | Blackmon | 363/21 |
| 5,768,113 | 6/1998 | Safraoul | 363/17 |
| 5,844,787 | 12/1998 | Fraidlin et al. | 363/21 |
| 5,850,335 | 12/1998 | Otake | 363/18 |
| 5,867,374 | 2/1999 | Moreau | 363/20 |
| 5,901,052 | 5/1999 | Strijker | 363/21 |

* cited by examiner

SLOPE-BASED PRIMARY FEEDBACK TO CONTROL THE OFF-TIME OF A POWER SUPPLY

BACKGROUND OF THE INVENTION

1. Field of the Invention

The present invention generally relates to high voltage power supplies for battery-powered portable systems, and more particularly to a method and apparatus for using slope-based primary feedback to control the off-time of a power supply.

2. Description of the Related Art

Conventional flyback-type power supplies have included a main switching device which is coupled to a source of electrical power and to a primary winding of a transformer. A secondary winding of the transformer has been coupled to a filter circuit and a load. Such flyback-type power supplies have utilized a transformer to provide electrical isolation between a source and a load as well as to store and transfer energy from the primary winding to the secondary winding. Flyback power supplies have typically been used for low voltage applications.

Flyback-type power supplies have experienced a common issue of secondary winding saturation. Secondary winding saturation occurs when the off-time of the primary winding is insufficient to allow complete dissipation of the energy in the secondary winding. Another issue with conventional flyback-type power supplies has been primary leakage inductance. Primary leakage inductance causes the primary winding voltage of the transformer to continue to increase beyond desired levels at transitions of the main switching device.

Fly-back type power supplies have typically utilized pulse width modulation at fixed frequency or fixed on-time as regulators. These regulators have typically included operational amplifiers and comparators.

Flyback-type power supplies have relied on either of two types of off-time feedback. Off-time with flyback-type power supplies has been determined by the particular load, battery voltage, and main switching device of the particular power supply. With one approach, off-time feedback is based on a comparison between an output voltage and a specified reference voltage. Another approach has been to base off-time on a predetermined timeout period (fixed frequency pulse width modulator). Other disadvantages of the prior art will become apparent to one skilled in the art after comparing such prior art with techniques described herein.

SUMMARY OF THE INVENTION

Briefly, a high voltage flyback power supply provides slope-based primary feedback to control the off-time of the power supply. When a negative slope is detected at a low side of a primary winding of the power supply, an off-time cycle is terminated and a next on-time cycle is initiated. The slope-based off-time primary feedback helps to keep the off-time of the power supply in sync with ringing of the primary leakage inductance and primary-side capacitance of the power supply. Such a power supply is particularly useful for battery-powered systems with low voltage rails.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

The following commonly-assigned patent application is incorporated by reference as if set forth in its entirety: U.S. patent application, Ser. No. 09/170,327, filed on Oct. 13, 1998, entitled "METHOD OF OPTIMIZING LOW FREQUENCY OUTPUT OF A TRANSDUCER IN A COMPUTER SYSTEM" to Mitchell A. Markow and Ji-An Gong.

COMPUTER SYSTEM

Figure 1:
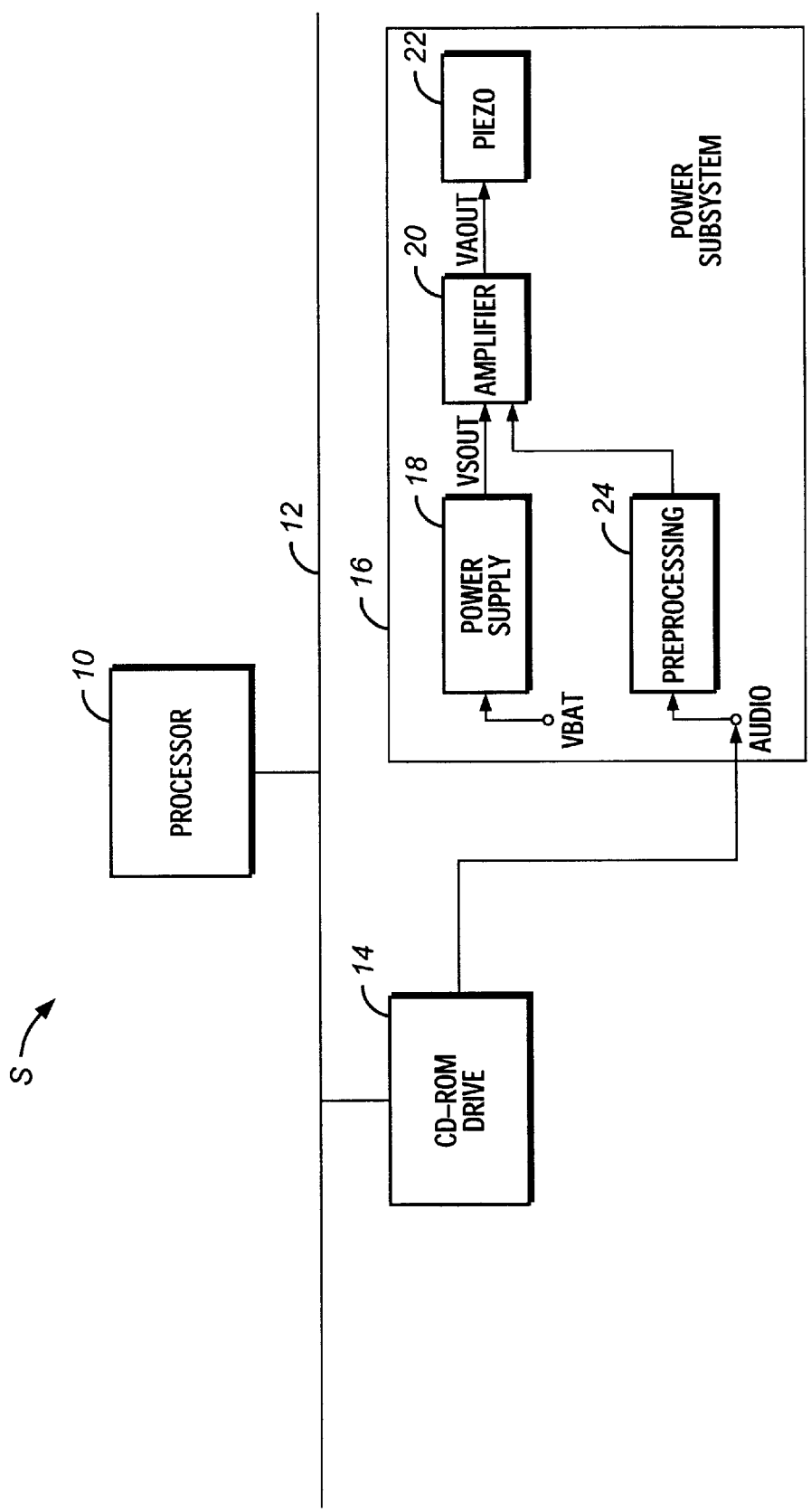
FIG. 1 is a block diagram of a computer system including a high voltage flyback power supply.

Turning now to the drawings, FIG. 1 shows an exemplary architecture of a portable computer system S. The computer system S includes an internal bus 12 coupled to a processor 10, a CD-ROM drive 14, and a power subsystem 16. Over the internal bus 12, the processor 10 can provide a variety of signaling to both the CD-ROM drive 14 and the power subsystem 16. The processor 10 also can communicate with a user interface, keyboard or other input device by which a user can provide commands to control the CD-ROM drive 14. It should be understood that audio signal generating devices other than a CD-ROM drive may alternatively be provided.

The power subsystem 16 is shown including a power supply 18, a voltage amplifier block 20 electrically coupled to the power supply 18, a pre-processing block 24 electrically coupled to the voltage amplifier block 20, and a piezoelectric transducer (also termed piezoelectric actuator) 22 electrically coupled to the voltage amplifier block 20. The pre-processing block 24 serves to equalize electrical signals representing sound (AUDIO) from the CD-ROM drive 14. The equalized sound signals are provided by the pre-processing block 24 to the amplifier block 20.

In addition to the sound signals from the pre-processing block 24, the amplifier block 20 receives direct current (DC) voltage rails represented by VSOUT from the power supply 18. The power supply 18 provides constant voltage rails over essentially the full frequency spectrum (i.e., full band) to the amplifier block 20. In particular, the power supply 18 steps up its input voltage VBAT to its output voltage VSOUT. The power supply 18 is a high voltage DC-to-DC step up power supply that here helps maximize the efficiency of the piezoelectric transducer 22. The power supply 18 is described in more detail below in connection with FIGS. 2 and 3.

The amplifier block 20, which is preferably a high voltage amplifier (linear or switching) that also helps maximize the efficiency of the piezoelectric transducer 22, provides amplified sound signals VAOUT to the piezoelectric transducer 22. The piezoelectric transducer 22 radiates the amplified sound signals for listening by a user by driving a speaker panel or other suitable surface of the computer system S. The speaker panel thereby acts as a speaker for sound signals originated by the CD-ROM drive 14. Alternatively, the power supply 18 and the amplifier 20 can be used to drive a load other than the piezoelectric transducer 22. One approach to utilizing a piezoelectric transducer in a computer system is described in a commonly-assigned patent application, entitled "METHOD OF OPTIMIZING LOW FREQUENCY OUTPUT OF A TRANSDUCER IN A COMPUTER SYSTEM," previously incorporated herein.

Unlike diaphragm-type transducers which are current-based devices, piezoelectric transducers are high impedance, voltage-based devices. That is, to increase low frequency output of a piezoelectric transducer, an increase in voltage is required. Due to efforts to maintain low power consumption for battery-powered portable systems, voltage "rails" within a battery-powered portable system have been quite low. Because of these low voltage rails, voltage tends to reach its limit in driving a piezoelectric transducer before current will. In the case of conventional battery-powered portable computer systems, the highest voltage rails typically seen have been on the order of 18 volts. The typical voltage rails in conventional battery-powered portable computer systems are 3.3 volts, 5 volts, and 12 volts. Voltage rails in conventional battery-powered portable computer systems thus have served to limit acoustic output from piezoelectric transducers.

Many typical components of the computer system S which are unnecessary to an understanding of the power subsystem 16 are not shown for sake of clarity. Also, it should be understood that the computer architecture depicted in FIG. 1 is illustrative and not exhaustive. A of alternative configurations of the computer system S can be employed in connection with the power subsystem 16. Similarly, a variety of alternative configurations of the power subsystem 16 can be employed in connection with the power supply 18. While the exemplary battery-powered system shown is a portable computer system, it should be understood that the power subsystem 16 can be utilized in various types of battery-powered portable systems. The power subsystem 16 basically should be useful for any battery-powered portable system with low voltage rails which can benefit from higher voltages.

POWER SUPPLY

Figure 2:
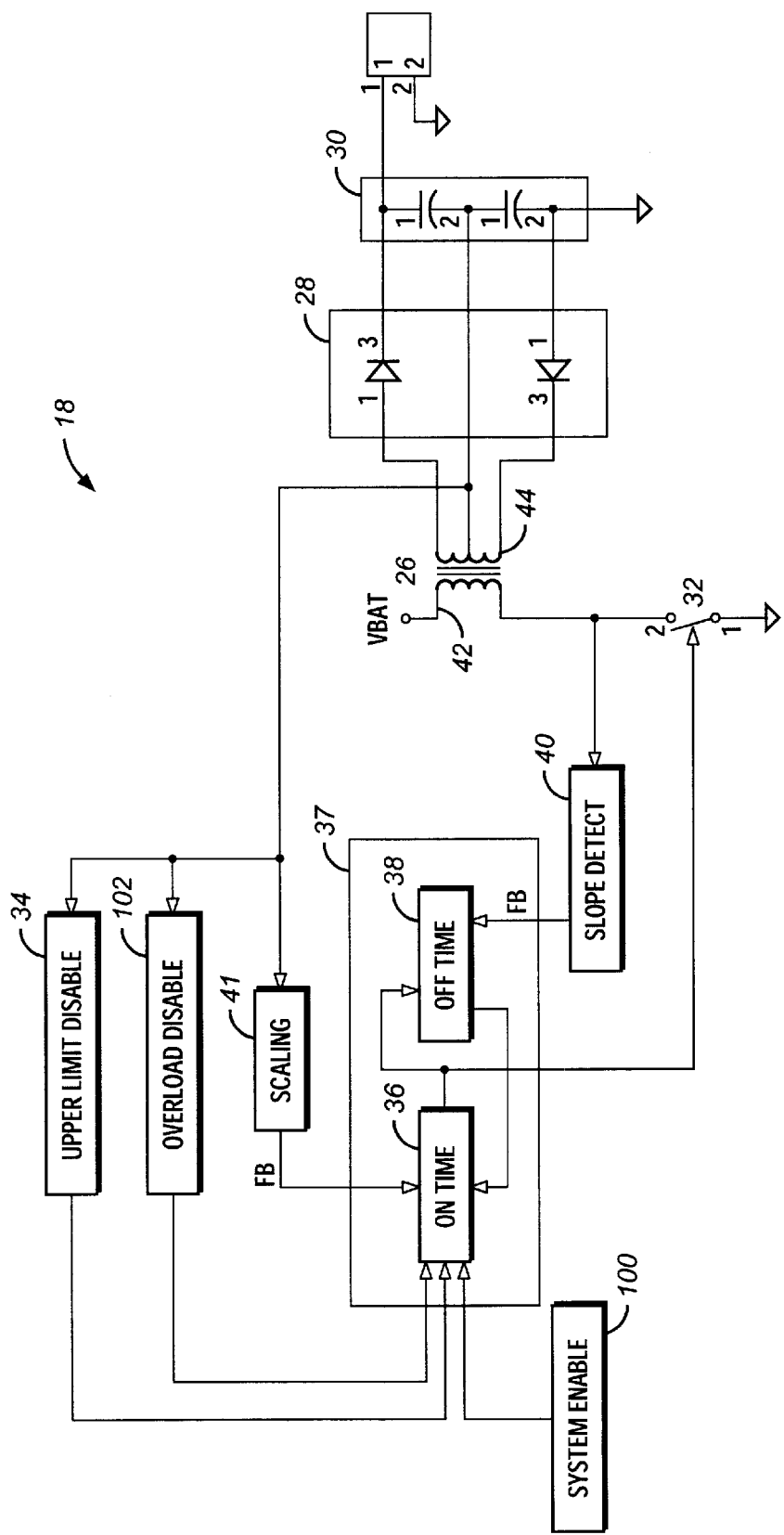
FIG. 2 is a circuit diagram of the high voltage flyback power supply of FIG. 1.

Referring to FIG. 2, an exemplary configuration of the low-power, high voltage power supply 18 within the power subsystem 16 is shown. The power supply 18 is an enhancement of a flyback configuration. A flyback power supply typically includes a main switching device coupled to a source of electrical power and a primary winding of a transformer. A secondary winding of the power supply is typically coupled to a filter circuit and a load. The transformer provides electrical isolation between a source and load and also stores and transfers energy from the primary winding to the secondary winding.

The power supply 18 is shown including a transformer 26, a diode network 28 electrically coupled to the transformer 26, a filter network 30 electrically coupled to the diode network 28 and the transformer 26, a main switch 32 electrically coupled to the transformer 26, a primary-side upper limit oscillator disable 34 electrically coupled to the secondary side of the transformer 26, an oscillator 37, and an oscillator or system enable 100. The oscillator 37 includes an on-time module 36 and an off-time module 38. As can be seen, the power supply 18 provides an on-time feedback network ("scaling") 41 and slope-based off-time feedback network ("slope detect") 40. The upper limit disable 34, the overload disable 102 and the on-time scaling network 41 provide signals to the on-time module 36. The on-time scaling network 41 provides a feedback signal FB to the on-time unit 36. The on-time unit 36 is also coupled to the main switch 32. The slope detect 40 provides a feedback signal FB to the off-time unit 38. The oscillator 37, the on-time feedback 41, slope-based off-time feedback 40, the oscillator enable 100, and the oscillator disable 34 are described in detail below. The power supply 18 is self-adapting based on the on-time feedback 41 and the off-time feedback 40. An overload detect 102 of the power supply 18 is used to shut the power supply 18 off at a predetermined overload timeout (i.e., a predetermined overload voltage is seen for a particular period of time). In this way, the power supply 18 is prevented from working too hard.

TRANSFORMER

The transformer 26 includes a primary winding 42 inductively coupled by a transformer core to a secondary winding 44. The high end of the primary winding 42 is shown tied to VBAT, and the low end of the primary winding 42 is shown tied to the switch 32 which is coupled to ground. Those skilled in the art will appreciate the principles of electromagnetic induction used by a transformer. When the switch 32 is closed or in an conducting state, current is supplied to the primary winding 42 from the power source VBAT, thereby storing energy or building up charge in the primary winding 42. Closing the switch 32 also charges the primary-side capacitor C1 and begins discharging of the switch's own capacitors. As is understood in the art, current stored in the primary winding 42 represents the energy stored in the primary winding 42 as a magnetic field. Also, as is understood in the art, the energy stored in the transformer 26 is a function of the change in current in the primary winding 42 and transformer core inductance which is limited by the core's saturation point. Based on the inductance of the primary winding 42 and the change in current in the primary winding 42, a particular voltage is induced in the primary winding 42. In a disclosed embodiment, the inductance of the transformer 26 is around 5 or 5½ uHs. While the switch 32 is closed, there is no current in the secondary winding 44. Current flow from the low side of the secondary winding 44, for example, is prevented into a lower diode of the diode network 28. The upper and lower diodes of the diode network 28 in effect serve as an open circuit when the switch 32 is closed. Also, when the switch 32 is closed, while the top end and the low end of the primary winding 42 respectively have a positive polarity and a negative polarity, the top end and low end of the secondary winding 44 respectively have a negative polarity and a positive polarity. The primary winding 42 thus is out of phase with the secondary winding 44.

When the switch 32 is open or in a non-conducting state, current stops flowing to the primary winding 42. The magnetic field built up in the transformer core 26 by the current in the primary winding 42 thus starts to discharge or collapse. As the secondary voltage (i.e., voltage in the secondary winding 44) matches an output voltage at the output capacitor network 30, the magnetic field induces a current in the secondary winding 44. In this way, the core of the transformer 26 discharges current into the secondary winding 44. The secondary voltage climbs until the secondary voltage matches the output voltage. At this point, the diode network 28 is turned on and current starts flowing into the output capacitor network 30. Current continues to flow into the output capacitor network 30 until the magnetic field is fully collapsed. Ideally, the power input to the primary winding 42 equals the power output in the secondary winding 44. In a disclosed embodiment, the power input is on the order of 12 watts.

When the switch 32 is in an open state, the top end and low end of the primary winding 42 are respectively negative polarity and positive polarity, and the top end and low end of the secondary winding 44 are respectively positive polarity and negative polarity. When the switch 32 is open, current from the top of the secondary winding 44 can flow into the upper diode of the diode network 28, across an upper junction or node between the diode network 28 and the output capacitor network 30, to a load (in this case, the amplifier 20), across a lower junction between the output capacitor network 30 and the diode network 28, into the lower diode of the diode network 28, and to the low end of the secondary winding 44. Current thus flows through the secondary loop (defined by the diode network 28, the output capacitor network 30, the secondary winding 44 and the load) from the positive or upper terminal of the secondary winding 44 to the negative or lower terminal of the secondary winding 44. Given the polarity of the primary winding 42 and the secondary winding 44 when the switch 32 is open and the polarity of the primary winding 42 and the secondary winding 44 when the switch 32 is closed, opening or closing the switch 32 causes a relative polarity shift for the primary winding 42 and the secondary winding 44.

Figure 3:
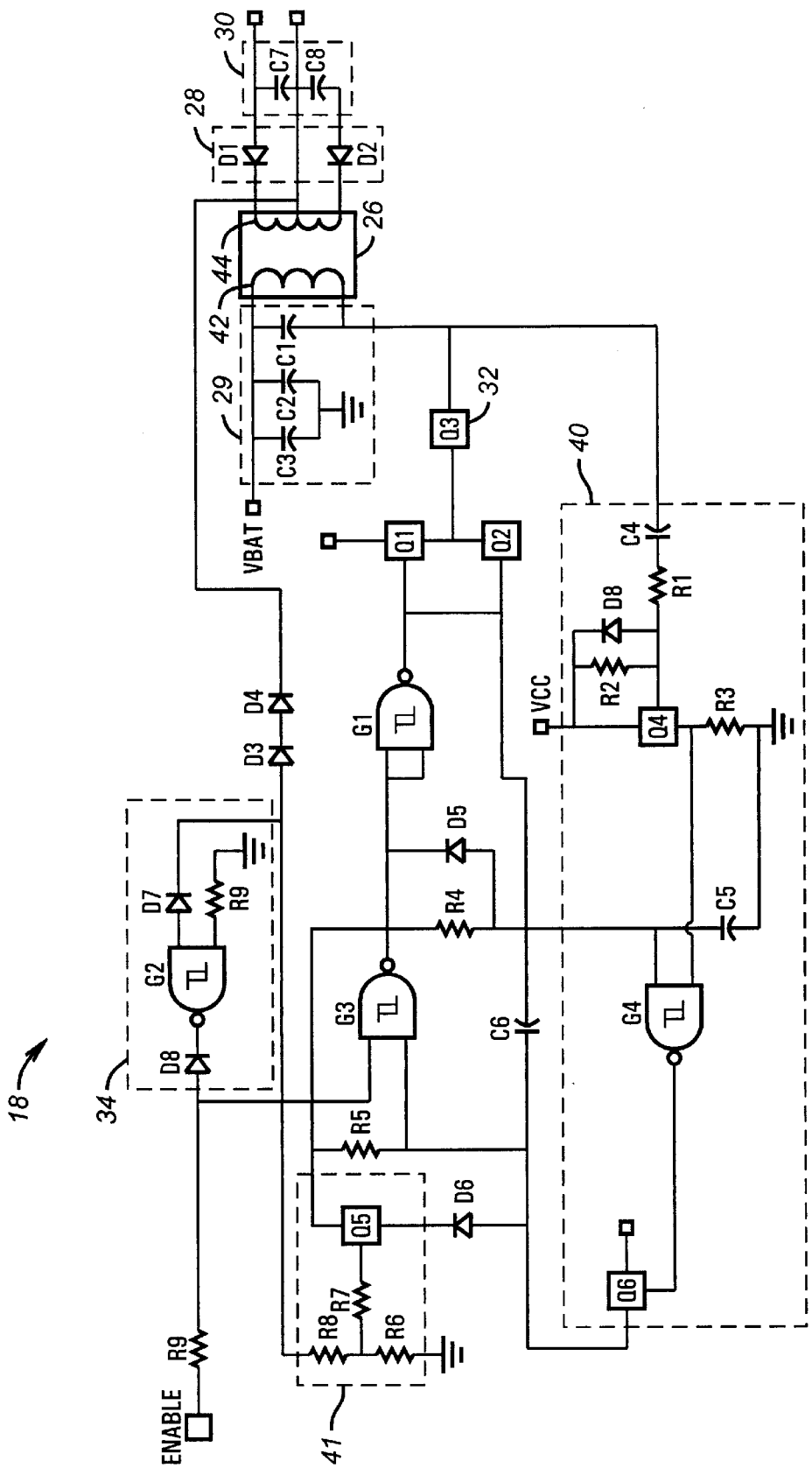
FIG. 3 is a more detailed circuit diagram of the high voltage flyback power supply of FIG. 2.

In a disclosed embodiment, the input voltage VBAT to the primary winding 42 is around 12–18 volts, and the output voltage VSOUT of secondary winding 44 can range up to 400 volts. The open circuit voltage in the primary winding 42 can be around 40 volts. In a disclosed embodiment, the operating frequency of the power supply 18 can range from 150 kHz under a relatively full load to 850 kHz under a relatively light load. Referring to FIG. 3, a capacitor network 29 is shown between VBAT and the transformer 26. A capacitor C2 and a capacitor C3 are coupled together in a parallel arrangement. Both the C2 capacitor and C3 capacitor are coupled to the primary-side C1 capacitor, VBAT and ground. The C1 capacitor is further coupled to the primary winding 42 and a Q3 transistor which corresponds to main switch 32 of FIG. 2.

OSCILLATOR

Turning to the oscillator 37 of the power supply 18, the off-time module 38 is used in determining the period for which the switch 32 is open, and the on-time module 36 is used in determining the period for which the switch 32 is closed. More particularly, the off-time module 38 varies the off-time such that the transformer 26 has sufficient time to discharge its energy. If the transformer 26 is activated before the secondary winding 44 has fully discharged its energy, then the transformer 26 core can become saturated. The on-time module 36 helps to keep the on time variable based on how much energy reeds to be transferred from the primary winding 42 to the secondary winding 44. The duration of the on-time determined by the on-time module 36 thereby depends upon the particular load. More particularly, the on-time feedback 41 is based on the secondary voltage of the transformer 26. Thus, for the oscillator 37, the off time and the on time are variable. The on-time is varied by secondary feedback, and the off-time is varied by slope-based primary feedback. In a disclosed embodiment, a center tap of the secondary winding 44 is fed back to the on-time module 36. It should be understood that on-time feedback 41 alternatively could originate from other leaves of the secondary winding 44. As represented by the arrows between the on-time module 36 and the off-time module 28, the oscillator 37 repeatedly alternates between an off-time period and an on-time period.

An oscillator is generally a circuit to convert a direct current input to a time-varying output. The oscillator 37 may, for example, serve as a triangular generator centered around half of a logic supply voltage. The oscillator 37 can include a NAND gate G3, a resistor R5, a NAND gate G1 and a capacitor C6. An output of the G3 NAND gate drives the G1 NAND gate. The output of the NAND gate G3 is coupled to the resistor R5 and a resistor R6. An input of the NAND gate G3 is coupled to the resistor R5. The output of the G1 NAND gate is coupled to a Q1 transistor and a Q2 transistor. An example of a logic chip with logic suitable for implementing the G1 and G3 NAND gates of the oscillator 37 is the 74HC132 quad two-input Schmitt trigger NAND gate chip which is commercially available. The disclosed oscillator 37 is essentially a CMOS-based (i.e., based on complementary metal oxide semiconductor) pulse width modulator, although the oscillator 37 might not be considered a pulse width modulator in the traditional sense.

SLOPE-BASED OFF-TIME FEEDBACK

The slope-based, off-time primary-side feedback 40 provided by the power supply 18 helps to vary the off time of the oscillator 37 based on collapsing of the magnetic field of the transformer 26. In a disclosed embodiment, the low or switch side of the primary winding 42 is fed back to the slope-based off-time feedback 40.

Referring to FIG. 3, a Q4 transistor serves as a negative slope detector of the slope-based off-time feedback 40. Due to primary leakage inductance, a magnetic field forces the voltage at the top of the main switch (Q3) 32 down and charges the primary-side capacitor C1 in the opposite direction. The voltage at the top of the main switch 32 goes below VBAT. The main switch 32 is capacitively coupled through a capacitor C4 to the switch Q4. When the main switch 32 starts heading toward zero indicating the transformer 26 is discharging, the switch Q4 in combination with the NAND gate G4 terminates the off-time and initiates the on-time of the oscillator 37. The switch Q4 watches for a negative slope (i.e., voltage drop) from the voltage at the top of the main switch 32. When the Q4 switch sees a negative slope and experiences a predetermined state, the Q4 switch logically switches the G4 NAND gate to a predetermined state, cutting short the off time. The G4 NAND gate basically serves as an off-time terminate logic. To restart the on-time, the main switch 32 pulls the low side of the primary winding 42 to ground, restarting charging of the transformer 26. The diode D8 is here used to protect the Q4 switch by clamping voltage at VCC when voltage at the Q4 switch rises. It should be understood that other ways of detecting a negative slope of the voltage at top of the main switch 32 may alternatively be used. While off-time feedback in conventional power supplies has typically been based on the difference between the primary-side voltage and a specified reference voltage or based on a timeout period, feedback here is based on the slope of the voltage at the low end of the primary winding 42.

In a disclosed embodiment, the voltage at the bottom or low side of the primary winding 42 can fall below the logic level of the particular logic chip of the oscillator 37. When the voltage at the bottom of the primary winding 42 starts to fall, the off-time is terminated and the next on-time is initiated. In this way, the switch 32 is turned on as the low side of the primary winding 42 approaches zero. This helps to avoid switching losses in the switch 32 and core loss for the transformer 26. This form of off-time feedback 40 keeps the off-time module 38 in sync with the ringing of the primary leakage inductance and the primary-side capacitor C1. The ringing otherwise would cause the voltage on the low side of the primary winding 42 to fall significantly since the leakage inductance wants to pass current even when the secondary winding 44 is fully charged. This particular form of leakage inductance appears in series with the primary winding 42 of the transformer 26. Leakage inductance is a natural result of there not being a perfect coupling between a primary winding and a secondary winding of a transformer. Since switching of the switch 32 is based on the slope of the voltage at the low end of the primary winding 42, the switch 32 does not need characteristics necessary to accurately detect when the voltage reaches zero.

Returning to FIG. 3, an exemplary implementation of the off-time feedback 40 is shown. The off-time feedback 40 includes a transistor Q6, a NAND gate G4, a capacitor C5, a transistor Q4, a resistor R2, a resistor R1 and a capacitor C4. The Q6 transistor is coupled to the output of the G4 transistor, an anode of the diode D6, and the capacitor C6. The Q6 transistor here forces the capacitor C6 to prematurely charge to restart the on-time. Until the Q6 transistor forces the capacitor C6 to charge, the time constant of the oscillator 37 is defined by the R5 resistor and the capacitor C6. When negative slope detect has not been triggered, the oscillator 37 is basically defined by the G1 NAND gate, G3 NAND gate, R5 resistor and C6 capacitor. If the output of the GI NAND gate is high, then the output of the G3 NAND gate is low. As a result, there is a low at the top of the R5 resistor and a high at the bottom of the C6 capacitor. Based on that polarity or configuration, the C6 capacitor is charging. As the C6 capacitor charges, the voltage decreases because the top side of the R5 resistor is low. As the junction of the R5 resistor and the C6 capacitor goes low, the G3 NAND gate at a certain trip point sees a low at its input and generates a high output. Since the output of the G3 NAND gate is high, the output of the G1 NAND gate is low, which turns off the primary switch Q3. The Q1 and Q2 transistors are here strictly used for buffering to provide a voltage level sufficient to turn the primary switch Q3 off. In an alternative embodiment, the Q1 and Q2 transistors might be eliminated. While the slope-based off-time feedback 40 is here used in connection with an oscillator 37 which is formed of CMOS-based digital logic, it should be understood that alternatively the slope-based off-time feedback 40 can be used in connection with a typical oscillator formed of operational amplifiers and comparators.

One input of the G4 NAND gate is coupled to the capacitor C5, the resistor R4, and the diode D5; the other input of the G4 NAND gate is coupled to the resistor R3 and the Q4 transistor. The R3 resistor is further coupled to both the Q4 transistor and ground. The C5 capacitor is here coupled to ground. The R4 resistor and the D5 diode are coupled together in a parallel or shunt arrangement. The R1 transistor is coupled to the capacitor C4. The R2 resistor is coupled to two terminals of the Q4 transistor. The resistor R4, the diode D5 and the capacitor C5 define a time constant to provide a guaranteed minimum off-time.

Figure 4:
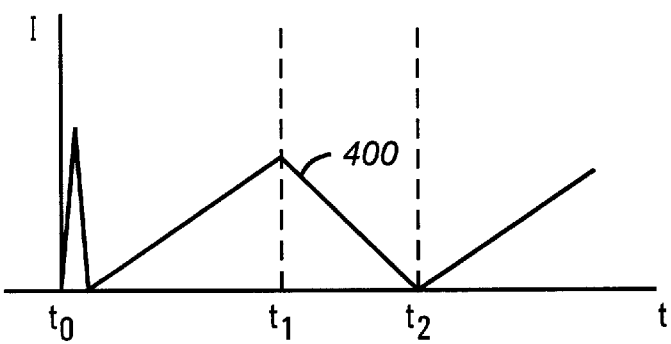
FIG. 4 is a graphical illustration of current through a main switch of the power supply of FIGS. 2 and 3.

Referring to FIG. 4, an exemplary graphical illustration of current through the main switch Q3 is shown. Current behavior is represented by an exemplary signal pattern 400. At time $t_0$, the main switch Q3 is turned on, causing a current surge to the primary-side capacitor C1. The time constant of the capacitor C1 is defined by one divided by the product of the resistance of the main switch Q3 (which is quite small) and the capacitance of the capacitor C1. At time $t_1$, the main switch Q3 is turned off, causing the current to decrease. At time $t_2$, when the main switch Q3 is turned on again, current increases based on the inductance of the transformer 26.

Figure 5:
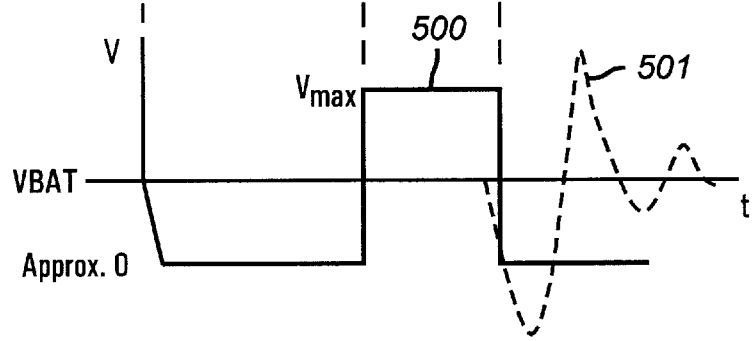
FIG. 5 is a graphical illustration of voltage at a low side of a primary winding of the power supply of FIGS. 2 and 3.

Referring to FIG. 5, an exemplary graphical illustration of voltage at the low primary side of the transformer 26 is shown. Voltage behavior is represented by an exemplary signal pattern 500. When the main switch Q3 is turned on at time $t_0$, the voltage decreases fairly quickly from VBAT to approximately zero volts. With the bottom end of the primary winding 44 at approximately zero volts and the top end of the primary winding 44 at VBAT, the transformer 26 begins to build a magnetic field. As the magnetic field builds, it draws more and more current. The voltage remains at approximately zero until time $t_1$ when the main switch Q3 is turned off. When the main switch Q3 is turned off or opened, the current reverses polarity and raises the voltage at the low side of the transformer 26 and a voltage at the high side of the secondary winding 44 to a voltage $V_{max}$ until the diode network 28 is turned on and current can flow into the secondary winding 44 charging the output capacitor network 30. The voltage $V_{max}$ is sufficiently high to overcome the voltage of the output capacitor network 30. In this case, the voltage $V_{max}$ is defined as the output voltage of the transformer 26 divided by the turns ratio of the transformer 26 plus VBAT. At time $t_2$, just before the main switch Q3 is turned on, primary leakage inductance recharges the primary-side capacitor C1, thereby lowering the voltage at the low primary side of the transformer 26. Primary leakage inductance is here used beneficially to drive the voltage below VBAT. By significantly reducing ringing in accordance with the disclosed techniques, the transformer 26 can run cooler and handle greater loads. In addition, significantly reducing ringing allows for use of a lower power main switch since the main switch Q3 does not need to repeatedly handle high voltages relative to VBAT. Typically, with conventional flyback power supplies when a main switch is turned on, the voltage at the low end of the primary winding oscillates in a ringing pattern 501 (as shown in broken line) and eventually settles at VBAT. Such ringing undesirably heats up a transformer.

OSCILLATOR UPPER LIMIT DISABLE

The oscillator upper limit disable 34 can be used to shut down the oscillator 37 when voltage in the secondary winding 44 reaches a desired upper limit. The oscillator disable 34 is particularly useful in the case of relatively light loads. With relatively light loads, the on-time is small. Since the frequency of the oscillator 37 goes up when the on-time is small, the oscillator 37 is shut off to prevent voltage in the secondary winding 44 from climbing too high. More particularly, when a voltage in the secondary winding 44 rises to a desired upper limit, a G2 NAND gate (FIG. 3) shuts down the oscillator 37 such that the transformer 26 is no longer being charged. If the output of the G2 NAND gate is low, the oscillator 37 is shut down. When the oscillator 37 is shut down, no power transfer occurs. When a voltage in the secondary winding 44 reaches a voltage level sufficiently below the predetermined upper voltage limit, the G2 NAND gate restarts the oscillator 37. The oscillator 37 is turned on when the output of the G2 NAND gate is high. The upper voltage limit can be a high voltage level which the oscillator 37 would only normally reach under light load or a high VBAT. The G2 NAND gate can be provided by a 74HC132 quad NAND gate chip. Alternatively, other CMOS-based digital logic may be utilized.

ON-TIME SCALING FEEDBACK

The on-time scaling feedback 41 shown in FIG. 3 includes a R6 resistor, a Q5 switch, a R7 resistor, and an R8 resistor. The R6 resistor is coupled to the R7 resistor, the R6 resistor and ground; the R7 resistor is serially coupled between the R8 resistor and the Q5 switch. When the voltage in the secondary winding 44 reaches a regulation point where the voltage overcomes the voltage drops of the D3 and D4 diodes, then the Q5 switch starts to shorten or scale back the on-time as the secondary voltages goes up. In this way, the magnetic field of the transformer 26 is charged less. When a load is relatively light, discharging too much current into the output capacitor network 30 can detrimentally result in ripple voltage. By charging the transformer 26 less during its on-time, such a ripple voltage can be avoided. Under relatively heavy loads, the secondary voltage does not reach its regulation point and the Q5 switch does not come into play.

OSCILLATOR ENABLE

The oscillator enable 100 provides a mechanism for the processor 10 through BIOS (basic input/output services) to turn on or turn off the oscillator 37. For example, if the power supply 18 is being used to drive the piezoelectric transducer 22 as shown in FIG. 1, then the power supply 18 is not needed when audio is not desired. When audio is not desired, the processor 10 based on a predetermined condition, such as entry into a suspended mode of the computer system S or a pulled pin, can disable the oscillator 37. This serves to reduce quiescent currents which are a common concern for battery-powered systems. An ENABLE signal shown in FIG. 3 is coupled to the processor 10. The ENABLE signal is shown coupled to a resistor R9 which is coupled to the diode D8 and the NAND gate G3. The NAND gate G3 is part of the oscillator 37. When the ENABLE signal is high, the oscillator 37 is enabled. When the ENABLE signal is low, the oscillator 37 is disabled. The oscillator or system enable 100 represents a computer controlled manner of disabling or enabling the power supply 18.

CONCLUSION

Thus, the disclosed techniques provide for greater control of switching characteristics of a power supply and more particularly provide off-time control of a CMOS-based pulse width modulator using primary side negative slope detect. The parasitics of a main switch and transformer are utilized to optimize the switching characteristics surrounding the off-time of the power supply. In this context, parasitics refers to primary leakage inductance and primary-side capacitance. The disclosed techniques also include on-time feedback to shorten or scale back the on-time of the power supply after the secondary-side voltage rises beyond a certain relatively high voltage level. A technique for shutting down the oscillator if a desired upper voltage limit is reached in the secondary winding is also disclosed.

While the disclosed techniques are described in the context of a switching power supply, it should be understood that alternatively a linear power supply can be utilized. The foregoing disclosure and description of the various embodiments are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A power supply, comprising:

a transformer;

a main switch coupled to a primary winding of said transformer at a node;

an oscillator coupled to the main switch, said oscillator having an on-time and an off-time; and a slope-based off-time feedback network coupled to said primary winding of the transformer and the oscillator to detect a negative slope of a voltage at said node and to terminate said off-time of the oscillator and initiate said on-time of the oscillator if a negative slope of said voltage at said node is detected.

2. A power supply according to claim 1, wherein the slope-based off-time feedback network comprises CMOS-based digital logic.

3. A power supply according to claim 1, wherein the oscillator comprises CMOS-based digital logic.

4. A power supply according to claim 1, further comprising:

an oscillator disable network coupled to the oscillator to disable the oscillator if voltage in a secondary winding of the transformer is above a desired upper limit.

5. A power supply according to claim 4, wherein the oscillator disable network comprises CMOS-based digital logic.

6. A power supply according to claim 1, the slope-based off-time feedback network comprising;

a negative slope detect logic to detect a negative slope of said voltage at said node; and an off-time disable logic coupled to the negative slope detect logic to terminate off-time of the oscillator if a negative slope of said voltage at said node is detected by the negative slope detect logic.

7. A battery-powered portable system, comprising:

a power subsystem comprising:

a power supply, comprising:

a transformer;

a main switch coupled to a primary winding of said transformer at a node;

an oscillator coupled to the main switch, said oscillator having an on-time and an off-time; and a slope-based off-time feedback network coupled to a primary winding of the transformer and the oscillator to detect a negative slope of a voltage at said node and to terminate off-time and initiate on-time if a negative slope of said voltage at said node is detected.

8. The portable system of claim 7, wherein the slope-based off-time feedback network comprises CMOS-based digital logic.

9. The portable system of claim 7, wherein the oscillator comprises CMOS-based digital logic.

10. The portable system of claim 7, the power supply further comprising:

an oscillator disable network coupled to the oscillator to disable the oscillator if voltage in a secondary winding of the transformer is above a desired upper limit.

11. The portable system of claim 10, wherein the oscillator disable network comprises CMOS-based digital logic.

12. The portable system of claim 7, the slope-based off-time feedback network comprising:

a negative slope detect logic to detect a negative slope of the voltage at said node; and an off-time disable logic coupled to the negative slope detect logic to terminate off-time of the oscillator if a negative slope of the voltage at said node is detected by the negative slope detect logic.

13. The portable system of claim 7, the power subsystem further comprising:

an amplifier coupled to the power supply.

14. The portable system of claim 12, the power subsystem further comprising:

a piezoelectric transducer coupled to the amplifier.

15. A method of controlling off-time for a power supply including an oscillator having an on-time and an off-time, a transformer and a main switch coupled between the oscillator and a primary winding of the transformer at a node, the method comprises steps of:

detecting a negative slope of a voltage at said node; and terminating off-time of the oscillator if a negative slope of the voltage at said node is detected by the detecting step.

16. The method of claim 15, further comprising the step of:

initiating the on-time of the oscillator after the terminating step.

17. The method of claim 15, the detecting step comprising the step of:

detecting a predetermined state of a negative slope detect switch capacitively coupled to the main switch.

18. The method of claim 15, the terminating step comprising the step of:

setting an off-time terminate logic gate coupled to the oscillator to a predetermined state.

19. The method of claim 15, wherein the oscillator comprises CMOS-based digital logic.

20. The method of claim 15, wherein the oscillator comprises an operational amplifier.

21. A slope-based off-time feedback circuitry for controlling off-time of a power supply, the circuitry comprising:

a negative slope detect logic to detect a negative slope of a voltage at a node coupled to a main switch of the power supply and a primary winding of a transformer of the power supply; and an off-time terminate logic to terminate off-time of an oscillator of the power supply if a negative slope of the voltage at said node is detected by the negative slope detect logic.

22. The off-time feedback circuitry of claim 21, the negative slope detected logic comprising:

a negative slope detect switch capacitively coupled at said node, the negative slope detect switch being configured to provide a predetermined state if a negative slope of the voltage at said node is detected.

23. The off-time feedback circuitry of clam 21, the off-time terminate logic comprising:

an off-time terminating logic gate coupled to the oscillator, the off-time terminating logic gate being set to provide a predetermined state if the negative slope detect logic detects a negative slope of the voltage at said node.

* * * * *